United States Patent [19]

Kuramochi et al.

[11] 4,033,146
[45] July 5, 1977

[54] GOVERNOR SUPPORTING MEMBER AND COUPLING MEANS

[75] Inventors: Kojiro Kuramochi; Yutaka Taga, both of Toyota, Japan

[73] Assignee: Toyota Jidosha Kogyo Kabushiki Kaisha, Japan

[22] Filed: Mar. 2, 1976

[21] Appl. No.: 663,051

[30] Foreign Application Priority Data

Dec. 5, 1975   Japan .......................... 50-143866

[52] U.S. Cl. .................................. 64/23; 74/63
[51] Int. Cl.² .......................................... F16D 3/06
[58] Field of Search ................ 64/23, 1 R; 74/63

[56] References Cited
UNITED STATES PATENTS

| | | | |
|---|---|---|---|
| 1,188,606 | 6/1916 | Barker et al. ................... | 64/23 X |
| 2,466,097 | 4/1949 | Grave ............................... | 64/23 X |
| 2,540,315 | 2/1951 | Andrews ........................... | 64/23 X |

Primary Examiner—Edgar W. Geoghegan

Attorney, Agent, or Firm—Toren, McGeady and Stanger

[57] ABSTRACT

A governor supporting assembly is adapted to serve also as coupling means between a first shaft, which may be the output shaft of the automatic transmission of a motor vehicle, and a second shaft while also mounting the governor for rotation jointly with said first shaft. A governor housing has secured thereto a cylindrical extension member arranged for engagement around portions of the coupled shafts. External axially extending splines formed on the engaging portions of the shafts are adapted to mesh with internal axially extending splines formed on the cylindrical extension member. A retaining or clip ring is fitted in annular grooves defined in both the externally splined surfaces of either of the shafts and in the internally splined surface of the cylindrical extension member in order to prevent relative axial movement of the engaged shaft with respect to the cylindrical extension member of the governor housing. The other shaft is arranged to be slidably movable relative to the extension member in the axial direction.

5 Claims, 1 Drawing Figure

U.S. Patent July 5, 1977 4,033,146
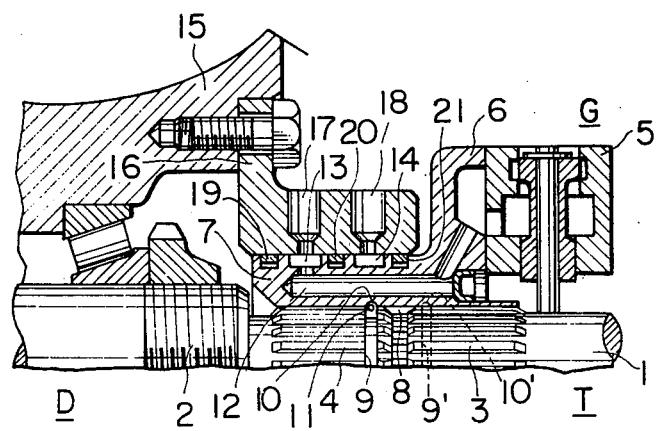

GOVERNOR SUPPORTING MEMBER AND COUPLING MEANS

BACKGROUND OF THE INVENTION

The present invention relates generally to support means for a governor in an automotive vehicle and more particularly to a governor supporting member which may serve also as coupling means between a pair of shafts. More specifically, the invention relates to a coupling device engaged between an output shaft of an automatic transmission and an input or propeller shaft of a differential gear in a motor vehicle.

It has generally been a common practice in the construction of motor vehicles to provide the output shaft of an automatic transmission in a coaxial relationship with an input or propeller shaft of a differential gear. In order to couple one of the shafts to the other, the end portion of the output shaft of the transmission has been formed with internal splines while the end portion of the input or propeller shaft of the differential gear is usually formed with external splines so that the externally splined end portion of the input shaft of the differential gear may be fitted in the internally splined end portion of the transmission shaft in order to place the shafts in meshing relationship with each other. Thus, a torque may be transmitted from one shaft to another while allowing axial relative movement between the two shafts.

Another attempt for coupling such shafts involves formation of both the end portion of the output shaft of an automatic transmission as well as the end portion of an input or propeller shaft of a differential gear with external splines in their outer peripheral surface, with an internally splined sleeve adapted to mesh with the external splines of both shafts being engaged between the shafts. The sleeve is thus fitted on both the end portions of the two shafts and rotatively couples one shaft to another.

It has been found, however, that these prior art structures involve drawbacks inasmuch as they create limitations in the manner in which the shafts must be shaped. In one arrangement, the end portion of the output shaft of the transmission must be formed into a cylindrical shape and internal splines must be provided in the inner peripheral surface of the engaging shaft or a sleeve of special construction must be provided separately.

Accordingly, it is an object of the present invention to provide a governor supporting member which serves also as a coupling between a first and a second shaft wherein the first shaft may be the output shaft of an automatic transmission and the second shaft may be an input or propeller shaft of a differential gear in a motor vehicle.

A further object of the invention is to provide a governor supporting member which serves as coupling means thereby avoiding the use of internally splined sleeves or of an internally splined cylindrical portion which must be formed at one end of the shaft.

SUMMARY OF THE INVENTION

Briefly, the present invention may be described as a governor supporting assembly serving also as coupling means between a pair of shafts for mounting a governor to rotate jointly with one of said shafts, said assembly comprising a governor housing having secured thereto a cylindrical extension member arranged for engagement around portions of both said shafts, with external axially extending splines being formed on said portions of both said shafts while internal axially extending splines are formed on the cylindrical extension member for meshing engagement with the external splines of the shafts. The assembly includes retaining means, which may comprise a clip ring fitted into axially aligned annular grooves defined in the internally splined cylindrical extension member and one of the externally splined shafts in order to prevent axial movement of the one shaft relative to the cylindrical extension member while permitting axial movement between the other shaft and the extension member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWING

In the drawing, the single FIGURE thereof is a longitudinal cross-sectional view of the assembly of the present invention showing a governor supporting member having a cylindrical extension portion which is in engagement between a transmission output shaft and a differential input shaft in accordance with the invention.

DETAILED DESCRIPTION OF THE PREFERRED EMBODIMENTS

Referring now to the drawing, wherein there is depicted a preferred embodiment of the present invention, an output shaft 1 of an automatic transmission T of a known type is arranged in coaxial but opposing relationship to an input shaft 2 of a differential gearing D of a known type. The opposing end portions of the shafts 1 and 2 are formed with external splines 3 and 4, respectively, which extend in the axial direction of the shafts along their outer peripheral surfaces. A governor G operates to produce a hydraulic pressure commensurate with the revolutions per minute of the output shaft 1 and feeds a developed pressure to an automatic transmission.

The governor G is formed with a governor housing or body 5 which is mounted on a governor supporting member 6 having a cylindrical extension member 7. The cylindrical extension member 7 is formed with internal splines 8 along its inner peripheral surface with the splines 8 being arranged for meshing engagement with the external splines 3 and 4 provided on the outer peripheral surfaces of the shafts 1 and 2.

Annular grooves 9 and 10 are defined respectively in the external splines 4 of the input shaft 2 and in the internal splines 8 of the cylindrical extension member 7, with the grooves 9 and 10 being axially aligned for engagement therewith by retaining means in the form of a clip ring 11 fitted in both annular grooves. The annular grooves 9 and 10 are in registry with the clip ring 11 and thereby operate to prevent axial relative movement between the input shaft 2 and the cylindrical extension member 7.

As will be apparent to those skilled in the art, the annular grooves may be provided, alternatively, as shown at 9' and 10' in the external splines 3 of the output shaft 1 and in the internal splines defined on the inner peripheral surface of the cylindrical extension member 7. In this case, however, the governor supporting member 6 is rigidly secured on the output shaft 1 of the transmission with regard to relative movement in the axial direction.

The assembly includes two oil passages 12, only one of which is visible in the drawing, with the oil passages 12 being provided to extend within the cylindrical extension member 7 of the governor supporting member 6. The oil passages 12 are arranged in a circumferentially spaced relationship relative to the shafts 1 and 2 and they are communicated with a cavity in the body 5 of the governor. Annular grooves 13 and 14 are provided in the outer peripheral surface of the cylindrical member 7 and the groove 13 is communicated with one of the oil passages 12 extending in the axial direction.

An adapter member 16 is secured to a housing 15 of the transmission and is arranged for slidable engagement with the cylindrical portion 7 of the governor supporting member 6. The adapter 16 is formed with two oil ports 17 and 18 extending radially with these ports being communicated with the annular grooves 13, 14, respectively.

The oil ports 17 and 18 are in communication with a hydraulic control circuit for an automatic transmission.

The assembly includes seal rings 19, 20 and 21 which are provided between the adapter 16 and the cylindrical extension member 7 thereby preventing oil leaks from occurring within the passages 13, 17, 14 and 18. The seal rings 19, 20 and 21, as shown in the drawing, are arranged with the annular oil grooves 13 and 14 therebetween.

In the construction of the assembly in accordance with the present invention, the splines 3 on the output shaft 1 and the splines 8 in the cylindrical extension member 7 are dimensioned for radially loose engagement therebetween thereby permitting a degree of displacement or play in the radial direction between the output shaft 1 and the extension member 7. However, the engagement between the splines 4 in the input shaft 2 and the splines 8 of the extension member 7 are arranged in relatively tight engagement thereby preventing displacement of the input shaft 2 in the radial direction.

It will be apparent that the input shaft 2 of the differential gear may be a propeller shaft.

As will be clear from the foregoing description of the governor supporting assembly in accordance with the present invention, the governor supporting member includes a cylindrical extension member provided with an internally splined, inner peripheral surface for meshing with the externally splined outer peripheral surfaces of the output shaft and the input or propeller shaft of a differential gear in a manner to allow axial relative movement of the input shaft to the cylindrical extension member thus dispensing with the necessity for coupling means referred to hereinbefore in conjunction with prior art arrangements. Additionally, it will be seen that the space required for the governor may be reduced and there will thereby be provided a rather compact and economical construction for a coupling of this type. The assembly enables appropriate mounting of the governor simultaneously with interengagement of the two shaft ends in a convenient and effective manner and eliminates the necessity for parts which would otherwise be required in prior art structures.

While specific embodiments of the invention have been shown and described in detail to illustrate the application of the inventive principles, it will be understood that the invention may be embodied otherwise without departing from such principles.

What is claimed is:

1. A governor supporting assembly serving as coupling means between a pair of shafts for mounting a governor to rotate jointly with one of said shafts comprising a governor housing having secured thereto a cylindrical extension member arranged for engagement around portions of both said shafts, external axially extending splines formed on said portions of both said shafts, internal axially extending splines formed in said cylindrical extension member in meshing engagement with said external splines of said portions of both said shafts and retaining means in engagement between said cylindrical extension member and either one of said shafts for preventing axial movement therebetween while permitting axial movement between said cylindrical extension member and the other of said shafts.

2. An assembly according to claim 1 wherein said retaining means comprise a clip ring and wherein said cylindrical extension member and said one of said shafts engaging said retaining means include axially aligned annular grooves with said clip ring engaged within said annular grooves.

3. An assembly according to claim 1 wherein one of said shafts comprises the output shaft of an automatic transmission including a transmission housing, said assembly further comprising an adapter member secured to said transmission housing and arranged in sliding engagement about said cylindrical extension member, oil ports defined in said adapter member, a pair of oil passages extending within said cylindrical extension member, oil ports defined in said adapter member, a pair of oil passages extending within said cylindrical extension member generally axially of said shafts and spaced apart circumferentially thereof, a cavity formed in said governor housing in communication with said oil passages, and annular oil grooves formed on the outer peripheral surface of said cylindrical extension member, with one of said oil passages being in communication with one of said oil grooves which is in turn communicated with the oil ports defined in said adapter member.

4. An assembly according to claim 3 including oil sealing rings located on the outer peripheral surface of said cylindrical extension member and arranged to have said annular oil grooves positioned therebetween.

5. An assembly according to claim 3 wherein said external splines of said output shaft are configured to engage said internal splines of said cylindrical extension member with a looser fit than the external splines of the other of said pair of shafts to provide more radial play therebetween.

* * * * *